UNITED STATES PATENT OFFICE.

WILLIS H. POST, OF BATTLE CREEK, MICHIGAN, ASSIGNOR TO POSTUM CEREAL COMPANY, LIMITED, OF BATTLE CREEK, MICHIGAN, A PARTNERSHIP.

BEVERAGE EXTRACT.

1,051,445.

Specification of Letters Patent.

Patented Jan. 28, 1913.

No Drawing.

Application filed May 10, 1912. Serial No. 696,486.

*To all whom it may concern:*

Be it known that I, WILLIS H. POST, of Battle Creek, Michigan, have invented a new and useful Improvement in Beverage Extracts, which invention is fully set forth in the following specification.

This invention relates to beverage extracts and has for its object to provide an extract of this class from roasted carbohydrate materials containing edible leguminous beans such as peanuts, peas, and ordinary beans which will readily dissolve in water, give a pleasant aroma and bitter flavor, will be nutritious and will not contain any alkaloid or other injurious substances.

Table beverages have heretofore been prepared from roasted peas, beans, acorns, wheat and other cereals by steeping or percolating the roasted material and serving in a manner similar to serving coffee. It is found by experience that the time required for the preparation of such beverages is practically prohibitive of its use where quick service is demanded, as in hotels and restaurants. Furthermore, to secure the best result in making such beverages, care is required according to the nature of the preparation, in the matter of time, temperature, and proportions of water to the materials, whereby the beverage may be clear and possess to the fullest extent the flavor and desirable properties characteristic of the roasted product.

I overcome the above objections by making a quickly soluble solid extract of the roasted materials, and I prepare this extract in a manner such that the characteristics of flavor and aroma of the roasted materials are retained unchanged in the solid extract, and all or so much of the extractive matter is taken out of the materials as is desirable to secure the best results in the matters of taste, flavor and character of nutritive material in the finished product.

To facilitate solution of the solid extract, I find it desirable to prepare it in a rather coarse granular form. This condition in general better resists the hygroscopic tendencies of the product, although I may prepare it in any degree of fineness desired.

For the purpose of illustrating the invention, I have herein recited specific ingredients and proportions, but I do not desire to be restricted to this specific example because certain of the ingredients may be omitted and the proportions may be varied within wide limits without sacrificing all the advantages of the invention.

The starting materials which I propose to use for making the roasted product from which I prepare the soluble extract are edible leguminous beans, such as peanuts, peas, ordinary beans and bran with New Orleans molasses. While I prefer to use a mixture of peanuts, peas and ordinary beans, I may use any one or more of these leguminous products and while I prefer molasses any saccharine body such as sugar, syrup, cane or glucose and even sugar-containing fruits such as figs or other fruits may be used. The bran is preferably wheat bran though other cereal brans may be substituted.

Assuming the beverage extract is to be prepared from peanuts, peas, beans, wheat bran and New Orleans molasses, the bran is mixed with about 20% of molasses and steamed in order to render the mass homogeneous, and is then dried and roasted, the temperature being carried to the point of browning to thoroughly caramelize the sugar of the molasses. A slight carbonizing is not injurious and brings out desirable flavors. The peanuts, peas and beans are separately roasted to a dark brown color and ground separately. Ten parts of roasted bran and molasses are mixed with one part each of roasted peanuts, peas and beans and treated with water to produce the aqueous extract. This extraction may be effected by treating the roasted product with either cold or warm water or by boiling the same therewith. I prefer, however, percolation with water at about 50° to 60° C. thereby obtaining usually a clear solution which is ready for evaporation with or without undergoing a separate step of filtration. The clear aqueous solution is next concentrated by evaporation to a solid. This operation is preferably conducted in a vacuum pan on a rotary drum *in vacuo*, the usual precautions well known to those skilled in this art being taken to prevent injurious heating of the product. The dried extract is then comminuted or reduced to grains, powder, flakes or other subdivided form and is ready for packing. The resulting product is a beverage extract of extreme solubility in water, either hot or cold and when a teaspoonful of the extract is dissolved in a cup of hot water, solution is effected in one minute or less. The resulting beverage is very palatable and possesses a pleasant aroma.

What I claim is:—

1. A solid soluble extract for preparing beverages, consisting of extractive matter in readily soluble form of roasted edible leguminous beans, bran and caramelized saccharine material.

2. A solid soluble extract for preparing beverages, consisting of extractive matter in readily soluble form of roasted peanuts, peas, ordinary beans, bran and caramelized saccharine material.

3. A solid soluble extract for preparing beverages, consisting of extractive matter in readily soluble form of roasted peanuts, peas, ordinary beans, wheat bran and caramelized molasses.

In testimony whereof I have signed this specification in the presence of two subscribing witnesses.

WILLIS H. POST.

Witnesses:
G. M. La Pierre,
Vern D. Sutton.